United States Patent
McLoone et al.

(10) Patent No.: US 6,939,067 B2
(45) Date of Patent: *Sep. 6, 2005

(54) KEYBOARD WITH IMPROVED LATERAL REGION

(75) Inventors: Hugh E. McLoone, Bellevue, WA (US); James H. Cauthorn, Seattle, WA (US); Jonathan A. Hayes, Seattle, WA (US); Carl J. Ledbetter, Lynnwood, WA (US); Steven N. Bathiche, Redmond, WA (US); William H. Vong, Seattle, WA (US); Kenneth V. Fry, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/735,651

(22) Filed: Dec. 16, 2003

(65) Prior Publication Data

US 2004/0126171 A1 Jul. 1, 2004

Related U.S. Application Data

(62) Division of application No. 10/326,105, filed on Dec. 23, 2002, which is a division of application No. 09/843,723, filed on Apr. 30, 2001, now Pat. No. 6,712,535.

(51) Int. Cl.[7] .................................................. B41J 5/10
(52) U.S. Cl. ....................................... 400/489; 400/472
(58) Field of Search .......................... 400/472, 485, 400/486, 489, 693, 691; 341/21, 22; 361/680; 345/168, 169

(56) References Cited

U.S. PATENT DOCUMENTS

| | | | |
|---|---|---|---|
| 4,491,933 A | 1/1985 | Ursin et al. ................ | 715/527 |
| 5,119,078 A | 6/1992 | Grant ......................... | 340/711 |
| 5,164,712 A | * 11/1992 | Niitsuma ..................... | 345/184 |
| 5,334,976 A | 8/1994 | Want ........................... | 341/22 |

(Continued)

FOREIGN PATENT DOCUMENTS

| | | |
|---|---|---|
| CN | 2155589 Y | 2/1994 |
| CN | 1158455 A | 9/1997 |

(Continued)

OTHER PUBLICATIONS http://www.dgp.utoronto.ca/OTP/papers/bill.buxon/2Hnavigation.html, *Two–handed Document Navigation*, 5 pages, Sep. 13, 2000.

(Continued)

*Primary Examiner*—Anthony H. Nguyen
(74) *Attorney, Agent, or Firm*—Banner & Witcoff, Ltd.

(57) ABSTRACT

A keyboard having an input region that provides a set of input elements designed to complement a separate pointing device such as a computer mouse. These input elements enable both the dominant and non-dominant hand to work easily together to perform various functions, which in turn, makes "consumption" and "composition" tasks more efficient. The input region may be spaced laterally from the alphanumeric or "QWERTY" section of the keyboard. The elements include a scrolling member, first and second groups of keys, and an application switching device. The scrolling member may take the form of a rotatable member. The rotatable member may have an asymmetric outer profile and/or be frustum-shaped. The first group of keys preferably includes a Back key and a Forward key. The first group of keys and the scrolling member make performing "consumption" tasks more efficient. The second group of keys preferably includes a Cut key, a Copy key, and a Paste key. The application switching device is preferably configured to provide a command, when actuated, to move between open applications. The application switching device may be independently-actuable, and/or dedicated and labeled as an application switching device. Additionally, the application switching device may be movable for actuation in opposing directions. Exemplary embodiments of the application switching device include a toggle switch, a rotatable dial, a laterally slidable member, and one or two keys. The second group of keys, application switching device and the scrolling member make performing "composition" tasks more efficient.

4 Claims, 6 Drawing Sheets

U.S. PATENT DOCUMENTS

| | | | |
|---|---|---|---|
| 5,390,005 A | 2/1995 | Kimoto et al. | 399/81 |
| 5,436,954 A | 7/1995 | Nishiyama et al. | 455/566 |
| 5,438,331 A | 8/1995 | Gilligan et al. | 341/35 |
| 5,476,332 A | 12/1995 | Cleveland, Jr. | 400/486 |
| 5,500,643 A * | 3/1996 | Grant | 341/122 |
| 5,825,353 A * | 10/1998 | Will | 345/184 |
| 5,825,612 A | 10/1998 | Aubuchon et al. | 361/680 |
| 5,936,614 A | 8/1999 | An et al. | 345/173 |
| 5,986,586 A | 11/1999 | Tsai | |
| 6,056,458 A | 5/2000 | Lin | |
| 6,098,086 A | 8/2000 | Krueger et al. | 715/535 |
| 6,111,527 A | 8/2000 | Susel | 341/22 |
| 6,137,490 A | 10/2000 | Shishido | |
| 6,142,687 A | 11/2000 | Lisak | 400/472 |
| 6,154,600 A | 11/2000 | Newman et al. | 386/4 |
| 6,219,021 B1 | 4/2001 | Izumi | 345/102 |
| 6,241,406 B1 | 6/2001 | Yan | 400/489 |
| 6,278,442 B1 | 8/2001 | Griffin et al. | 345/169 |
| 6,307,535 B1 * | 10/2001 | Kim et al. | 345/157 |
| 6,388,660 B1 * | 5/2002 | Manser et al. | 345/173 |
| 6,404,415 B1 * | 6/2002 | Kim | 345/157 |
| 6,489,950 B1 * | 12/2002 | Griffin et al. | 345/168 |
| 6,677,927 B1 * | 1/2004 | Bruck et al. | 345/156 |
| 2001/0005199 A1 | 6/2001 | Anderson | 345/168 |

FOREIGN PATENT DOCUMENTS

| | | |
|---|---|---|
| CN | 1225464 A | 8/1999 |
| DE | 200 03 668 U 1 | 5/2000 |
| TW | 00378769 | 1/2000 |
| TW | 00383115 | 2/2000 |
| WO | WO 97/27529 | 7/1997 |

OTHER PUBLICATIONS http://www.dp.utoronto.ca/OTP/papers/bill.buxton/2Hands.html, *A Study In Two–Handed Input*, 10 pages, Sep. 13, 2000.

http://cogprints.soton.ac.uk/archives/psyc/papers/199803/199803026/doc.html/jmb_87.html, *Asymmetric Division of Labor in Human Skilled Bimanual Action: The Kinematic Chain as a Model*, 28 pages, May 12, 1999.

Myers, Brad, A., et al., Abstract, *Two–Handed Input Using A PDA And A Mouse*, 8 sheets, (date of Publication unknown, but prior to filing of application).

MacKenzie, Scott, Slide presentation, *(How) To Scroll or (How) Not To Scroll*, 46 sheets, 1998.

Zhai, Shumin, Slide presentation, *Input devices and techniques: Multi0DOF, Multi–hand, Multi–Stream, Multi–functional, and Multi–modal*, 7 sheets, 1999.

* cited by examiner

US 6,939,067 B2

KEYBOARD WITH IMPROVED LATERAL REGION

CROSS REFERENCE TO RELATED APPLICATION

This application is a division of U.S. application Ser. No. 10/326,105, filed Dec. 23, 2002, which is a division of U.S. application Ser. No. 09/843,723, filed Apr. 30, 2001 now U.S. Pat. No. 6,712,535, and is related to U.S. patent application Ser. No. 09/843,724, entitled Keyboard with Improved Numeric Section; U.S. patent application Ser. No. 09/843,799, entitled Keyboard with Improved Function and Editing Sections; and U.S. patent application Ser. No. 09/843,794, entitled Input Device Including a Wheel Assembly for Scrolling an Image in Multiple Directions, all of which have been filed simultaneously with application Ser. No. 09/843,723 and are commonly assigned with the present application. These applications are hereby incorporated by reference.

FIELD OF THE INVENTION

The present invention generally relates to keyboards for entering data into text and office systems such as computers. More specifically, the present invention relates to a keyboard having an improved lateral input region for increasing the efficiency of consumption and composition of information used in computer activities.

BACKGROUND OF THE INVENTION

People use computers for many different activities. Many activities commonly performed by computer users may be considered as "consumption" activities. Other activities commonly performed by computer users may be considered as "composition" activities. Consumption activities are activities where the user typically reads, listens to, searches for, locates, and/or "gathers" information from one or more sources. For example, consumption activities include browsing the Internet, or otherwise viewing information on screen, such as viewing spreadsheets or reading e-mail, reports, documents, or other text and images. Consumption activities are commonly performed when the user is browsing or searching web pages and databases. When performing these activities, it is common to use "Back" and "Forward" commands, scroll within an open document, and/or switch between open applications for multi-tasking or for referencing or sharing information between different documents. However, existing keyboards have not maximized a user's ability to perform these consumption activities.

Composition activities are activities performed by computer users when editing, creating, and/or composing text, web pages, spreadsheets, video or audio data, or other forms of data that can be presented on computer display. During these activities, it is common to highlight and edit various data portions, switch between multiple documents and applications, and/or scroll within existing documents. It is also common to take pieces of information or data from one document and put them into another document—either of the same document type or a different document type. Similarly, existing keyboards have not maximized a user's ability to perform these composition activities.

Additionally, to perform consumption and composition activities, a user commonly uses a keyboard in conjunction with a separate pointing device such as a computer mouse. However, there has been little improvement to existing keyboards for increasing the combined efficiency of a keyboard and a separate pointing device. For example, many keyboards are designed in a manner that requires the user to change hand positions frequently between the keyboard and the separate pointing device to perform many common tasks. This, in turn, results in increased distractions and reduced focus when performing various consumption and composition activities.

Further, interactions between keyboards and separate pointing devices for performing many computer tasks commonly place much of the burden on the dominant hand, typically the right hand, that traditionally controls the mouse or other pointing device. This can overburden the dominant hand to an extent that prevents the maximization of efficiency. Further, many existing short commands are performed by reaching for and engaging the separate pointing device (e.g., to "copy" a selected item). However, the step of reaching and engaging the separate pointing device reduces efficiency if the activities just prior to and just following engaging the pointing device are typing on the keyboard—as can commonly be the case.

Additionally, when using a computer, users will commonly switch between open applications or "window". An open application or window is an active program and/or open file. To perform this task, users commonly reach for a mouse or another separate pointing device, move the cursor to a desired location positioned over a graphical user interface, such as an icon on a task bar, and click on a graphical user interface corresponding to a desired open application. At least one operating system, MICROSOFT® WINDOWS®, provides a keyboard shortcut whereby pressing the Alt key and the Tab key in combination (with the Alt key being pressed first) can effect switching between open applications. However, many users are not aware that this shortcut exists, and its use also has drawbacks, as it requires a two-step sequential operation to activate and an awkward position in the left hand.

Accordingly, a keyboard enabling a user to more efficiently perform consumption and composition based activities and switch between open applications, and reduce unnecessary actions for commonly performed tasks was thus needed.

SUMMARY OF THE INVENTION

It is an aspect of the present invention to provide an improved keyboard having a functional and advantageous lateral input region.

An aspect of the present invention is to provide a new set of input elements on a computer keyboard designed to complement an separate pointing device such as a computer mouse. These input elements enable both the dominant and non-dominant hand to work easily together to perform various functions, which in turn, increases user efficiency when performing "consumption" and "composition" tasks.

Further aspects of the invention provide a keyboard having an alphanumeric section, and an input region disposed laterally from the alphanumeric section. The input region has a rotatable member or other scrolling device and an input element for providing a Forward or a Back command when activated.

Other aspects of the invention provide a keyboard having an alphanumeric section, and an input region disposed laterally from the alphanumeric section. The input region has a rotatable member or other scrolling device. The input region also has a Cut key, a Copy key, and a Paste key.

In other aspects of the invention, a keyboard includes an application switching device configured to provide a command, when actuated, to move between open applications or windows. The application switching device is (a) independently-actuable, (b) provided with indicia indicating its function, (c) dedicated as an application switching device, and/or (d) spaced from an alphanumeric section of the keyboard.

In yet other aspects of the invention, a keyboard includes a rotatable member. The rotatable member has an asymmetric outer profile and/or is frustum-shaped.

Further objects, features and other aspects of this invention will be understood from the following detailed description of the preferred embodiments of this invention with reference to the attached drawing figures.

DETAILED DESCRIPTION OF THE INVENTION

Figure 1:
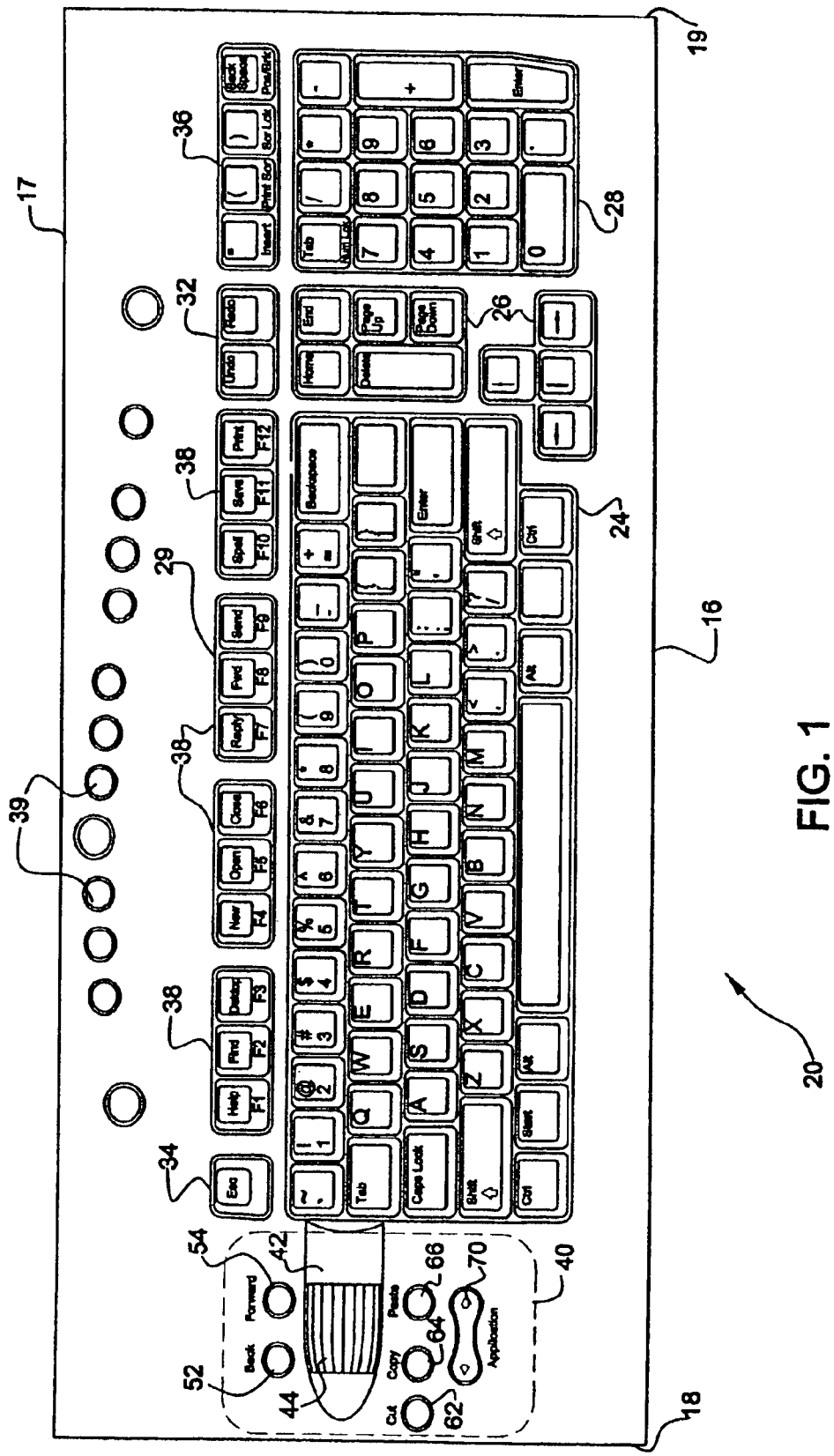
FIG. 1 is a plan view of an exemplary keyboard according to one or more aspects of the present invention.

As a preface to this section, a few terms as used herein are defined.

A "key cluster" is defined as a group of keys, each of which is immediately adjacent, or in close proximity, to at least another key within the cluster and set apart from other keys on the keyboard by a distance larger than the spacing between the adjacent keys in the cluster and by a portion of the keyboard housing.

A key is "labeled" as a certain type of key when it includes indicia thereon or immediately adjacent thereto corresponding to the image to be provided or associated function to be performed when that key is pressed.

An "input region" is a group of input elements disposed in an area proximal to one another. An "input zone" is an input region wherein all of the input elements are positioned such that each input element is positioned within the natural finger extension range of the common user to be accessible by the digits of the hand when he or she is using the other input elements in the zone. Preferably, an input zone is no more than 12.5 centimeters in length in any direction.

Exemplary keyboard designs of the present invention are shown in FIGS. 1–5 and designated by reference numeral 20. For reference purposes, the keyboard 20 has a front edge 16 adjacent the user during normal use, and a back edge 17 distal from the user during normal use. Accordingly, an object is said herein to be "behind" another object when it is between that object and the back edge 17. An object is said herein to be "directly behind" another object when it is between that object and the back edge 17 and at least partially located within the lateral bounds of that object extending in the front-to-back direction. An object is said herein to be "entirely directly behind" another object when it is between that object and the back edge 17 and entirely located within the lateral bounds of that object extending in the front-to-back direction. An object is said herein to be "in front of" another object when it is between that object and the front edge 16. Further, the keyboard 20 also has left and right edges 18 and 19. The direction "lateral" defines the general directions from the left edge 18 to the right edge 19 and from the right edge 19 to the left edge 18.

In a preferred embodiment, the keyboard 20 includes an alphanumeric section 24, an editing section 26, a numeric section 28, and a function section 29. The alphanumeric section 24, sometimes referred to as the QWERTY section, may include keys for each of the letters of the alphabet, each of the digits 0–9, and various punctuation symbols. The alphanumeric section 24 may alternatively be a subset of these keys. The editing section 26, preferably located immediately to the right of the alphanumeric section 24, preferably includes four arrow keys, Delete, Home, End, PageUp, and PageDown keys. The numeric section 28, is preferably to the right of the editing section 26. The numeric section 28 preferably includes digit keys 0–9, arithmetic function keys /, *, –, and +, a decimal separator key, and an Enter key. The function section 29 preferably includes an Escape (or Esc) key 34 and one or more groups 38 of keys behind the alphanumeric section 24, one or more groups 36 of keys behind the numeric section 28, and one or more groups 32 of keys behind the editing section 26. These keys preferably form a laterally extending row. The keys in this row may be standard function keys and/or may be command keys preferably labeled according to the command they perform when pressed. The keys need not be limited to the key as labeled. Additionally, the keyboard 20 preferably includes a laterally extending row of "launch" or additional command keys 39 preferably located behind the row of keys in the function section 29.

The keyboard 20 also preferably includes an input region in the form of input zone 40, which in a preferred embodiment, is located laterally to the left of alphanumeric section 24. The input zone 40 has a number of input devices including a first key group 50, a scroll device such as a scroll wheel 44, a second key group 60, and an application switching device 70. By "wheel" as used in this context, it is meant a rotatable device that rotates about a single axis. In the illustrated embodiment, the scroll wheel 44 is mounted for rotation about an axis extending laterally relative to the keyboard 20. The wheel 44 may be rotated in a common method of operation by engaging the periphery of the wheel 44 with a thumb and/or one or more fingers, and rotating the wheel 44 in a forward or a backward direction. Rotation of the wheel 44 can cause an image on a display to scroll relative to the display screen. The scroll wheel 44 may be provided to function in any desired manner to convert the rotational movement of the wheel 44 to an appropriate command to cause scrolling. Scroll wheels have been provided on computer mice to effect scrolling and any such arrangement may be used for sensing rotation of the wheel 44. In one arrangement, as the scroll wheel 44 is rotated, an encoder senses the rotation of an encoder wheel and delivers a corresponding signal to a host computer. This signal, in turn, can be used to scroll an image as is known in the art. Scrolling is helpful when a document is longer than the height of the display screen and the user would like to see the entire document.

In an exemplary embodiment, the scroll wheel 44 has an exposed portion for user manipulation that is preferably within the range of 2–5 cm in width and may have of a width of 3 cm. Additionally, the wheel 44 may also have a constant diameter, such as a diameter in the range of 1.5–3 cm. In many embodiments, the width is greater than its diameter. In lieu of a constant diameter, the wheel 44 may have a tapered diameter and/or be frustum-shaped as illustrated in the embodiment in FIGS. 1 and 2. In this illustrated embodiment, the exposed portion of the wheel 44 has a diameter that decreases from one lateral end to the other. Stated in an alternative manner, the wheel 44 has an asymmetric outer profile or diameter from a lateral center line. For example, the wheel 44 has a first diameter d1 at the lateral end proximal to the alphanumeric section 24 that tapers to a second smaller diameter d2 at the lateral end distal to the alphanumeric section 24. In one embodiment, the wheel may have a 2.0–2.7 cm diameter at its larger lateral end d1, and a 1.5–2.0 cm diameter at its smaller lateral end d2. One example of such an embodiment would provide the wheel with a 2.5 cm diameter at its larger lateral end d1, and a 1.9 cm diameter at its smaller lateral end d2. However, the wheel 44 may be provided with any desirable size and/or taper. Such a profiled diameter can facilitate the interface with one or multiple fingers of the user. For example, if the user chooses to use one, two, three, or all of the index finger, middle finger, ring finger, and/or little finger on his or her left hand, and maintain the fingers in a front-to-back orientation relative to the keyboard, the taper of the wheel 44 creates a profile that better corresponds to the location of the tips of these fingers. If desired, the outer surface of the wheel 44 may be preferably provided with a feature for enhancing grip such as grooves or ribs, as schematically shown, or a high friction material coating, such as rubber.

In lieu of a scroll wheel 44, an alternative scrolling device such as a touch pad, a slider, a D-pad, such as those used on game controllers, joystick, or any other suitable input device may be used as a scrolling device to affect scrolling.

Further, the wheel 44 may be used to scroll a document horizontally when the document is wider than the width of the display screen according to known techniques such as positioning the cursor over a graphical horizontal scroll bar and rotating the scroll wheel 44. Additionally, the scroll wheel 44 may be movable in a side-to-side manner to affect horizontal or left and right scrolling. With such a side-to-side action, the wheel could depress internal or external switches actuating horizontal scrolling action. Such an embodiment may be used and is disclosed in copending U.S. patent application Ser. No. 09/843,794, filed simultaneously herewith, entitled "Input Device Including a Wheel Assembly for Scrolling an Image in Multiple Directions," which is hereby incorporated by reference as to its entirety.

Figure 2:
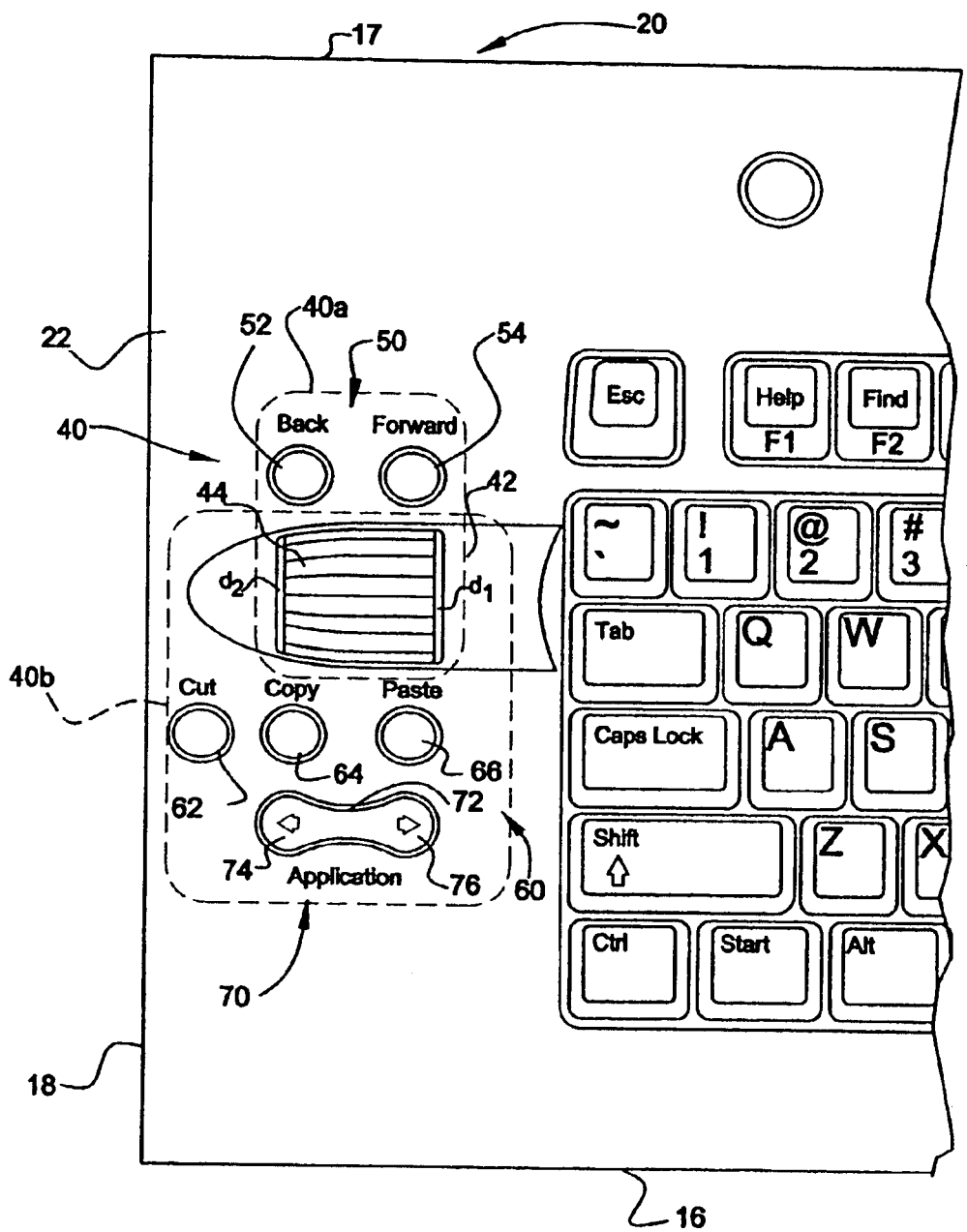
FIG. 2 is an enlarged plan view of a region located laterally from the alphanumeric section of the keyboard of FIG. 1.

A raised laterally-extending portion 42 of the housing 22, referred to herein as a dividing ridge or a locating ridge, is preferably provided on opposing lateral sides of the wheel 44, and the wheel 44 may be located in the ridge 42. This ridge 42 is a raised upper portion of the housing 22 and facilitates the user's ability to locate and manipulate the wheel 44 and adjacent input elements without visual inspection by providing tactile feedback to the user. Further, it also facilitates visual location of these the features by serving a visual indicator. Thus, in turn, it enables the user to remain more visually and mentally engaged with activity in the display while enabling "blind" location and manipulation of the wheel 44. Further, the ridge 42 helps subdivide the input zone 40 into a first consumption region or consumption zone 40a and a composition region or composition zone 40b (as shown in FIG. 2). The first consumption region or consumption zone 40a preferably includes the scroll wheel 44 and a first set 50 of keys 52 and 54 on one side of the ridge 42. The composition region or composition zone 40b preferably includes the scroll wheel 44, a second set 60 of keys 62, 64, and 66, and/or an application switching device 70 on the opposite side of the ridge 42 from the first set 50 of keys.

The first key group 50 preferably includes a Back key 52 and a Forward key 54. The Back and Forward keys 52 and 54, when activated, will cause a Back or Forward command to be provided, respectively. These commands are commonly used with an internet browser where the browser will provide information corresponding to a web address in a list that is immediately behind or immediately following the current web address in the list. Each of these keys 52 and 54 are preferably located in close proximity to the scroll wheel 44. In one embodiment, as shown, these keys 52 and 54 are each located 2.5 centimeters or less from the wheel 44 and/or 2.5 centimeters or less from each adjacent key.

The second key group 60 preferably includes a Cut key 62, a Copy key 64 and a Paste key 66. These keys 60, 62 and 64 are preferably located in close proximity to the scroll wheel 44. These commands are commonly used to cut, copy, and paste information from one area in a file to another area in the file or to a different file in a well known manner. In one embodiment, as shown, these keys 62, 64, and 66 are each located 2.5 centimeters or less from the wheel 44 and/or 2.5 centimeters or less from each other. The ordering of the keys 62, 64, and 66 corresponds to the ordering of the Cut, Copy and Paste graphical icons on graphical tool bars on commonly used programs with editing features. Such ordering and spacing also are beneficial in that the Cut, Copy, and Paste keys, are placed under the ring, middle, and index fingers, respectively. This is beneficial because the relative frequency of use of these keys (Paste is the most frequently used key in the set and Cut is the least frequently used key in the set) advantageously corresponds to the relative dexterity and strength of the fingers actuating these keys (the index finger is the strongest and most dexterous in the set, while the ring finger is the weakest and least dexterous in the set).

The keys 52, 54, 62, 64, and 66 are also preferably labeled as or according to the command they perform when pressed. In a preferred arrangement, the indicia corresponding to the command is printed immediately adjacent to or on each input element or key to indicate its use.

The keys 52, 54, 62, 64, and 66 may preferably be low-profile keys as opposed to the keys in the alphanumeric section 24, the editing section 26, the numeric section 28, and or the keys 38 behind these sections 24, 26, and 28. That is, the upper surfaces of these keys 52, 54, 62, 64, and 66 are preferably flush or slightly raised above the upper surface of the housing 22. The buttons or keys 52, 54, 62, 64, and 66 may be oval-shaped as shown. Alternatively, the keys may be round, square, or any other desired shape. If desired, the keys 52, 54, 62, 64, and 66 may have the same size, shape, and/or profile as the standard alphanumeric keys or of other keys on the keyboard.

Additionally, in one arrangement, the keys 52, 54, 62, 64, and 66 have an upper surface area that is preferably in the range between 50–80 $mm^2$, e.g., 64 $mm^2$. However, it is recognized that they may have an upper surface area in the range between 50 $mm^2$ to 195 $mm^2$, or they may be of any other suitable size. Further, the keys 52, 54, 62, 64, and 66 are preferably spaced to provide gaps between adjacent keys in each group 50 and 60 within the range of 14 mm to 23 mm, e.g., 21 mm. It is recognized that the gaps may also be larger or smaller. It is also recognized that any other type of key may be used.

Further, it is recognized that other input devices may be used to provide these commands. For example, in lieu of distinct keys 52 and 54 to provide Back and Forward commands, a toggle, rotatable dial, or slidable member, similar to those illustrated in FIGS. 2–4 for the application switching device 70, or other input device, may be used.

The application switching device 70 is preferably also included in the input zone 40, may be any desired element or elements for switching between open applications. However, an application switching device 70, such as those depicted in the figures, may be located at any location on the keyboard. The application switching device 70 enables the user to quickly move between open applications. For example, the application switching device 70 may include a toggle or rocker switch 72 as shown in FIG. 2. The toggle switch 72 is preferably mounted for pivotal movement relative to the housing 22. The switch 72 includes opposing first and second ends 74 and 76, each of which may be pressed to switch applications as described below. In an exemplary embodiment, the first and second ends 74 and 76 of the toggle switch 72 are generally oval or ovoid shaped and are connected by a center section. However, in lieu of such an arrangement, the first and second ends 74 and 76 may be circular, square, rectangular, or any other desired shape. Further, the first and second ends 74 and 76 are preferably sized to have an area ranging between 64 mm$^2$ to 195 mm$^2$, e.g., 100 mm$^2$, and spaced center-to-center by a distance ranging from 14 mm to 23 mm, e.g., 21 mm. However, it is recognized that these ends 74 and 76 may be of any desired size and spacing.

Figure 3:
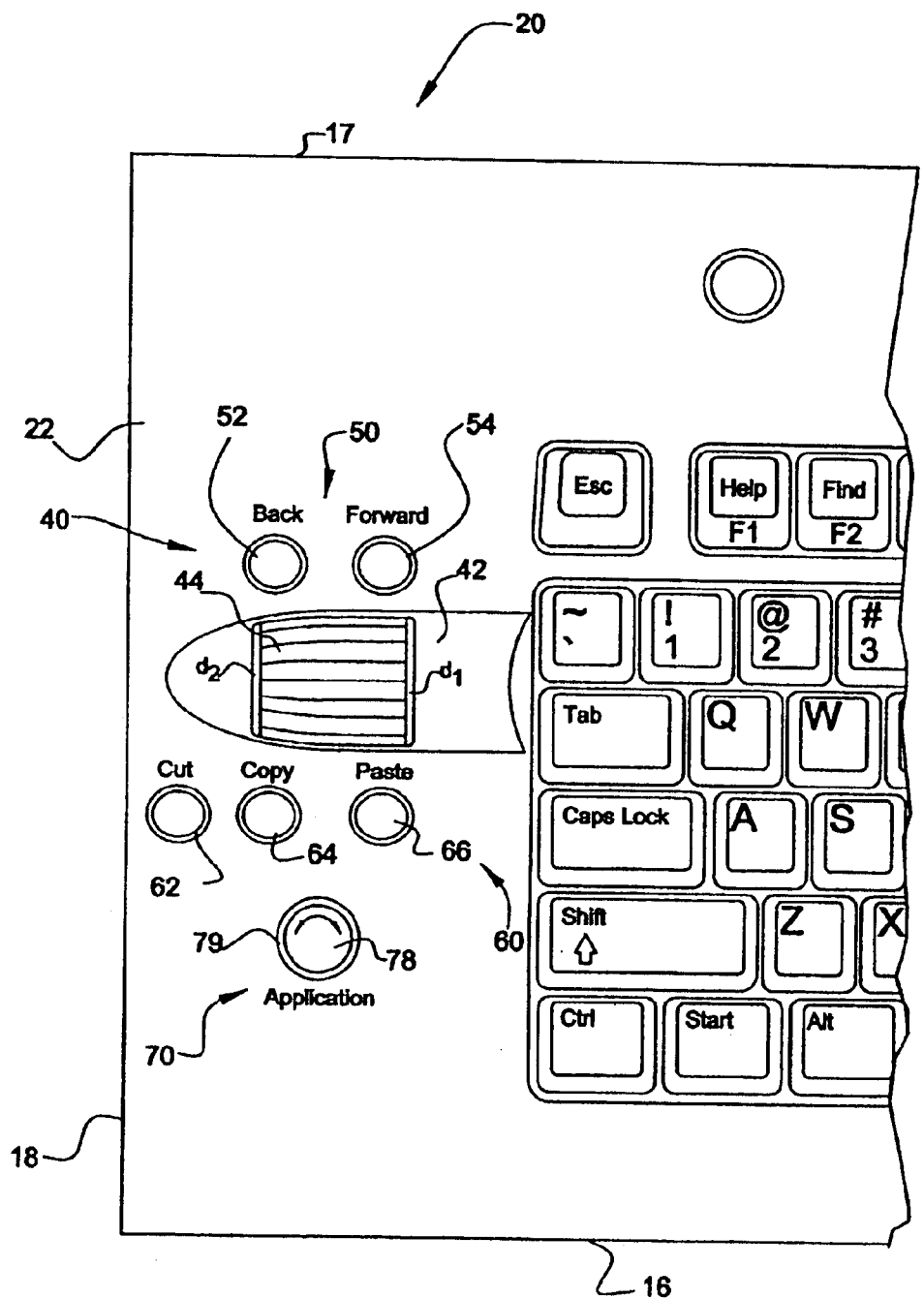
FIGS. 3–5 are enlarged plan views similar to FIG. 2 showing alternate embodiments of an application switching device.

FIG. 3 illustrates another exemplary embodiment of an application switching device 70. In this embodiment, the application switching device 70 takes the form of a rotatable dial 78. The dial 78 is preferably rotatable about an axis perpendicular to the upper surface of the housing 22 for rotation in a plane parallel to the upper surface of the housing 22. Preferably, sensors inside of the housing detect when the dial has been rotated clockwise or counter-clockwise by a predetermined amount. Any desired sensing device may be used to determine rotation of the dial such as a multi-position switch. Additionally, the outer circumference 79 of the dial 78 is preferably provided with a feature for enhancing grip such as grooves, ribs, or a high friction material coating, such as rubber. The dial 78 may be any desired size.

Figure 4:
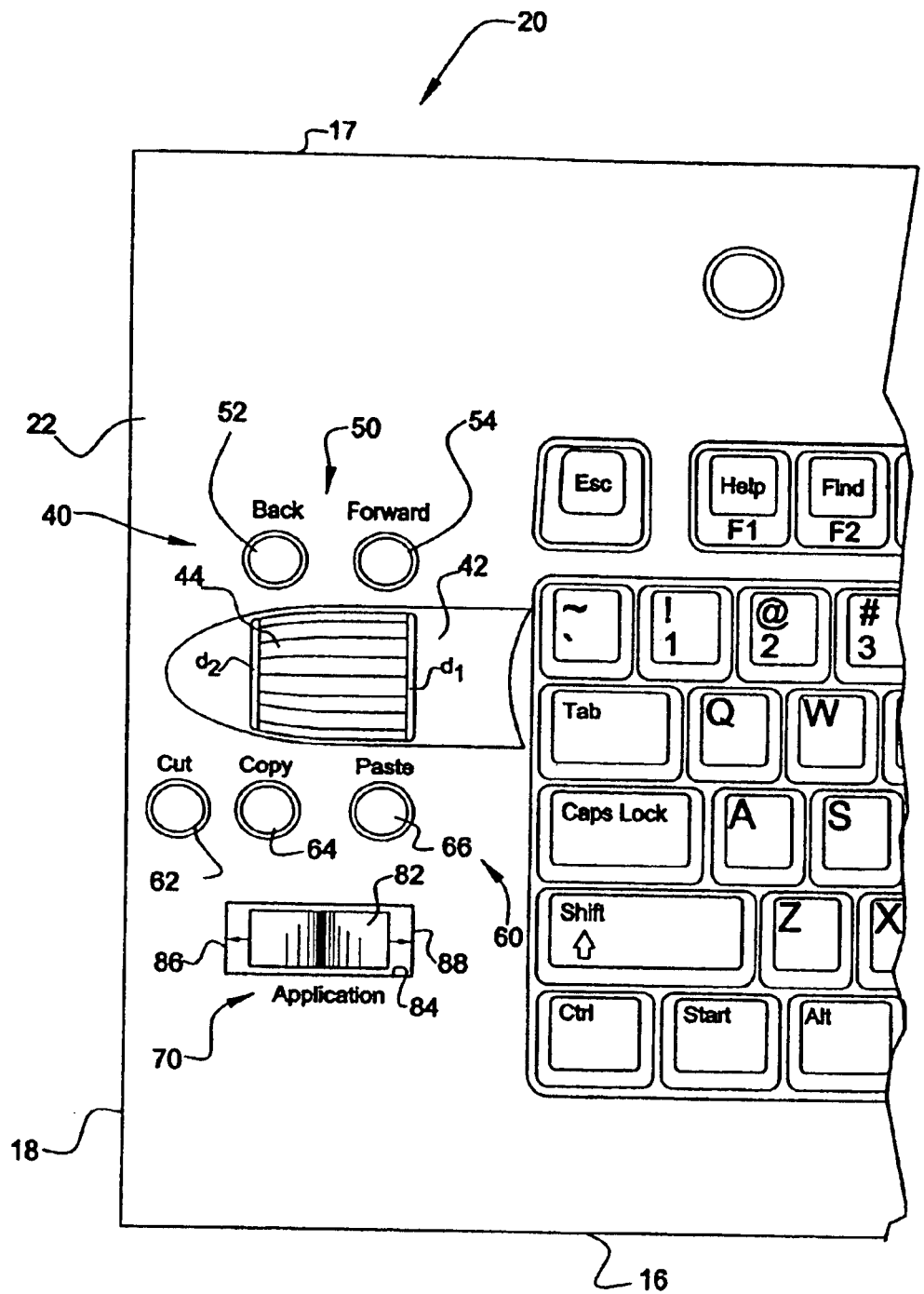

FIG. 4 illustrates another exemplary embodiment of an application switching device 70. In this embodiment, the application switching device 70 takes the form of a slider 80. The slider 80 preferably includes a slot 84 in the keyboard housing 22 and a slider member 82 movable within the slot 84, and more specifically, between the lateral ends 86, 88 of the slot 84. Any desired sensing device, such as a multi-position switch, may be used to determine displacement of the slider member 82. The slider member 82 may be designed to facilitate manipulation by one or more fingers of the user. In one example, the slider member 82 may have a raised center section 89 facilitating movement of the slider member 82 in either lateral direction.

In the embodiments shown in FIGS. 2–4, the movable member in the application switching device 70 is preferably a three-position device. That is, it has a center position, and moving the member in one of two opposite or opposing directions can perform activation. Each of the application switching devices 70 in FIGS. 2–4 preferably includes one or more biasing members, such as a spring, not shown, to bias the movable member to its center position, so that it returns to its center position upon release by the user. The three position movable members in FIGS. 2–4 also present a beneficial design because they prevent unintended simultaneously activation in both directions.

Figure 5:
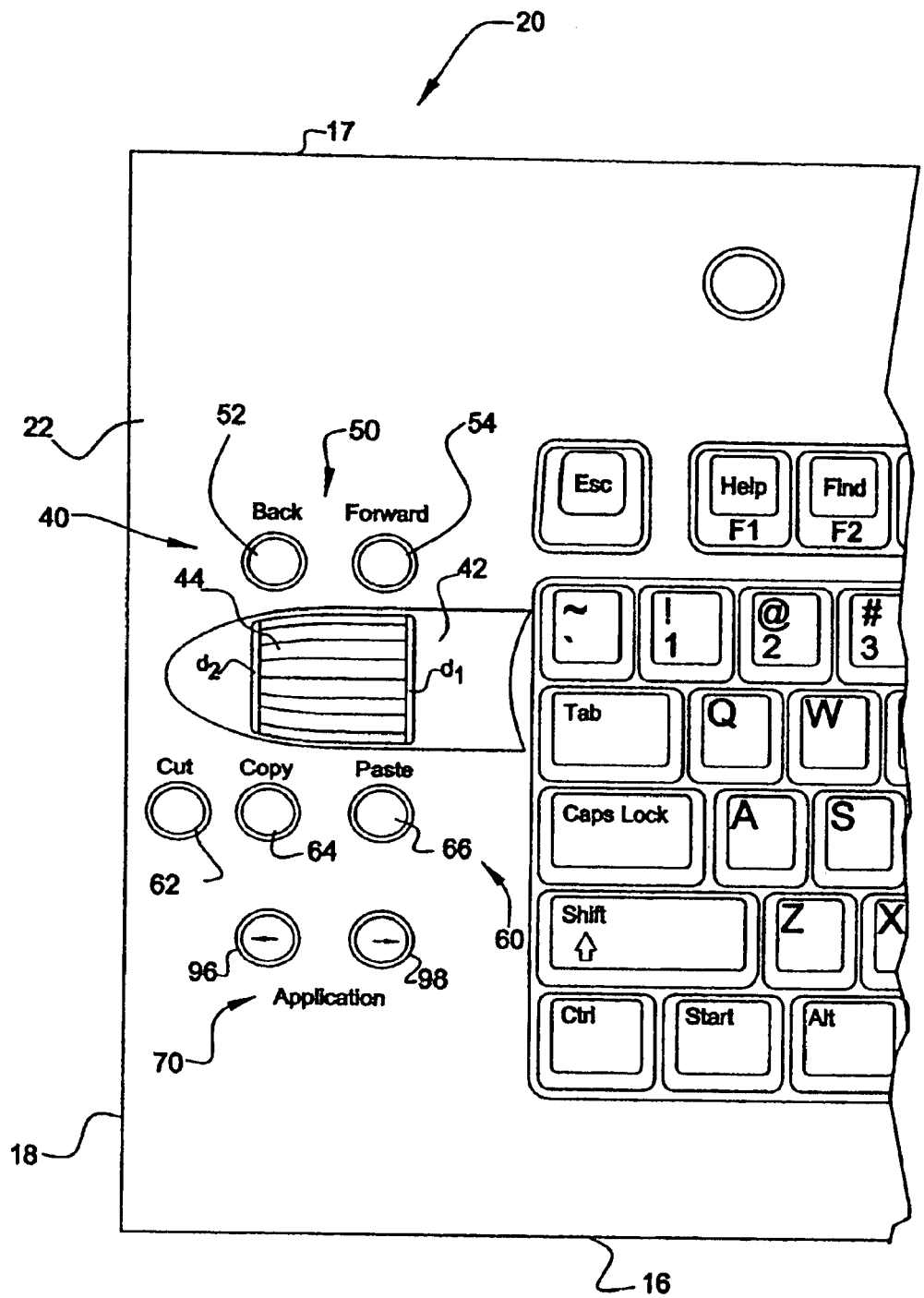

FIG. 5 illustrates another exemplary embodiment of an application switching device 70. In this embodiment, the application switching device 70 takes the form of two distinct buttons 96, 98. If desired, the application switching device 70 can take the form of a single button that can switch the application in a single direction within a list of applications.

In the embodiments shown in FIGS. 2, 4, and 5, the application switching device 70, whether it is composed of a single member (FIGS. 2 and 4) or plural distinct members (FIG. 5), is preferably laterally (i.e., horizontally) oriented. That is, the single or multiple members are laterally elongated or are laterally spaced. This orientation can be beneficial because it corresponds biomechanically to the finger-hand action and because it corresponds to graphical interface action. However, the application switching device may alternatively be oriented in a different direction, such as vertical or diagonal.

Upon activation of the application switching device 70 by the appropriate method, e.g., by pivoting (FIG. 2), rotating (FIG. 3), sliding (FIG. 4), or pressing (FIG. 5), a command is sent to present a graphical interface on the display corresponding to the next (i.e., following/forward or previous/back) open application or window in the list.

In the exemplary embodiments as shown, the application switching device 70 is independently-actuable. By "independently-actuable" it is meant that it can function independently without the need of assistance of other input devices. In other words, it means that the application switching device 70 can be activated by a user to switch applications without the need to provide additional user input, such as the simultaneously pressing of an additional key. The application switching device 70 is also preferably labeled by one or more words or symbols providing an indication that the corresponding input element(s) is for application switching. In a preferred arrangement, the word "Application" may be provided on or adjacent to the application switching device 70. It is also preferred that the application switching device 70 be dedicated for application switching and not be an element usable for performing tasks. However, it is recognized that the application switching device 70 need not be independently-actuable, labeled, and/or dedicated for application switching.

Operation of the application switching device 70 will be described in conjunction with FIG. 6 that illustrates a graphical user interface on a display screen 100. Many operating systems, including MICROSOFT® WINDOWS®, enables the running of multiple applications at the same time. Examples of applications include word processors, database programs, Web browsers, development tools, drawing, paint, image editing programs, and communication programs. Applications use the services of the computer's operating system and may use other supporting applications. Using a separate window for each application, the user can interact with each application and go from one application to another without having to reinitiate it. Having different information or activities in multiple windows may also make it easier for a computer user to work more efficiently.

Figure 6:
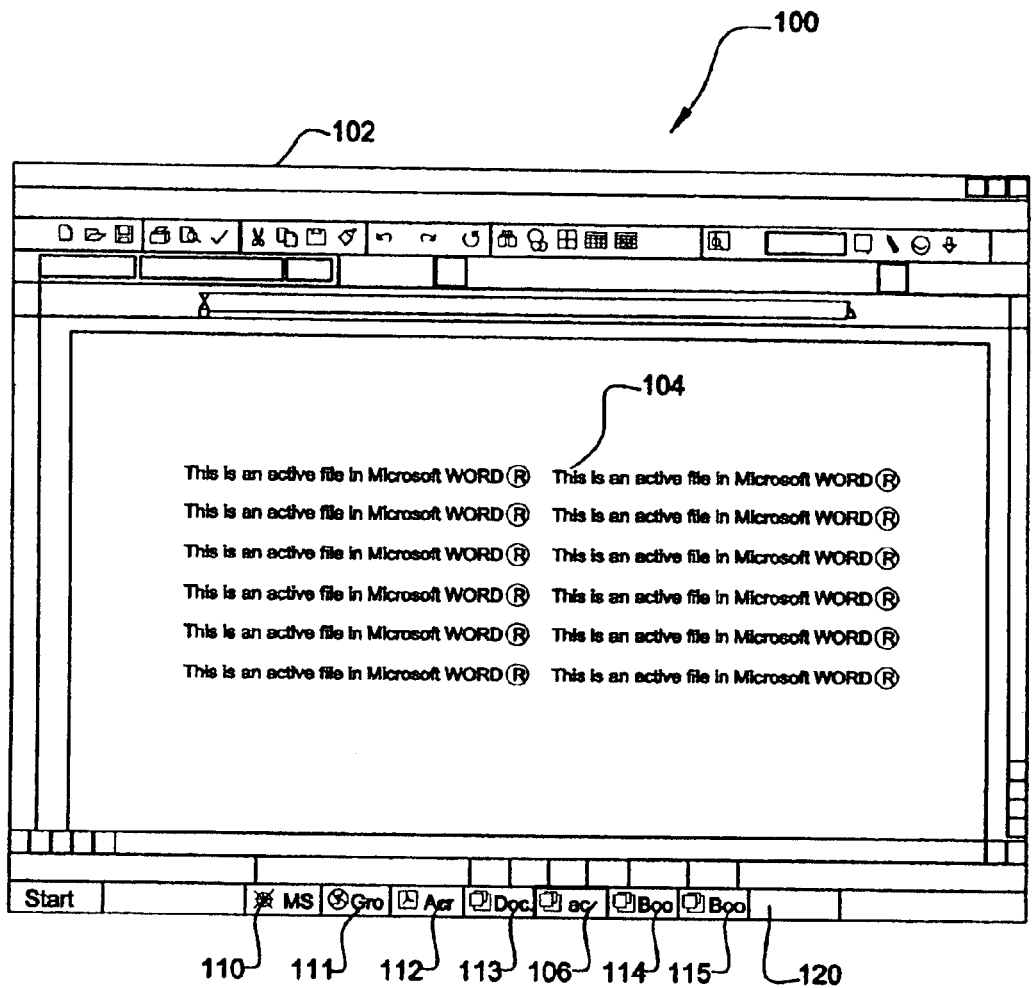
FIG. 6 is a graphical user interface in the MICROSOFT® WINDOWS® operating environment showing an open or active file in a first graphical interface region and a plurality of graphical icons corresponding to other open files and applications.

In FIG. 6, the active application is a MICROSOFT® Word file, shown by a graphical user interface or window 102, and in this case, having text 104 therein. Icons 110–115 on the taskbar 120 graphically represent other currently running applications, which may be located at the bottom of the display 100. A windowing systems built into the operating system manages and places these applications in an order, such as the order in which they are opened or initiated. In FIG. 6, the order on the taskbar 120 includes four applications 110–113, the open application 106, and two additional applications 114–115. Applications, as used in this context, denote different program applications as well as different application files. For example, application 113 and open application 106 are both MICROSOFT® Word files.

Actuating the application switching device 70 will switch the open application to the application that is next (either following or previous) in the list. For example, in the illustrated embodiments, by (i) pressing the right side 76 of toggle 72 (FIG. 2), (ii) rotating the dial 78 clockwise (FIG. 3), (iii) translating the slider member 82 to the right (FIG. 4), or (iv) pressing key 98 (FIG. 5), the open application 106 will switch to application 114. Each successive actuation, as described above, causes the open application to switch from application 114 to application 115, to application 110, to application 111, to application 112, to application 113, and back to application 106, and so on. The user may switch the open application in the opposite direction in the list, e.g., from application 106 to application 113, by: (i) pressing the left side 74 of toggle 72 (FIG. 2), (ii) rotating the dial 78 counter-clockwise (FIG. 3), (iii) translating the slider member 82 to the left (FIG. 4), or (iv) pressing key 96 (FIG. 5). Each successive actuation in that direction will cause the open application to switch from application 113 to application 112, to application 111, to application 110, to application 115, to application 114, and back to application 106, and so on. While it is preferred that the provided application switching device 70 provide the capability to switch applications in both directions (bi-directional), it is recognized that an application switching device may be provided that only provides application switching in single direction (uni-directional). It is noted that while the direction of switching of the multi-directional application switching devices 70 preferably cause switching in the direction as described above, it could be programmed to switch applications in the opposite direction. While the switching of the applications/windows has been described based on a chronologically ordering system (as opened) that exists on some common operating systems, the application switching device could be used to switch applications/windows regardless of the ordering system used by the operating system.

The input zone 40 on the computer keyboard 20 provides a user with a set of input elements that can be used to cooperate with an external pointing device, such as a mouse. This enables the dominant and non-dominant hands to work together to perform various functions, which in turn, makes "consumption" and "composition" tasks more efficient, and makes reaching for the mouse unnecessary to perform some actions. In one advantage, the elements on the input zone 40 can be used by the non-mouse hand (i.e., the non-dominant hand) of the user while the external pointing device may be used by the mouse hand (i.e., the dominant hand). Thus, it provides a palette of tools so that gross actions can be performed by the non-dominant hand to complement fine actions being performed by the dominant hand on a computer mouse.

The Forward and Back buttons 52 and 54 in combination with the scrolling device, e.g., wheel 44, in close proximity enhances the "consumption" aspect of using the keyboard. In operation, the user has the option to select documents, web pages, or other items with the dominant hand (e.g., the right hand), and with the non-dominant hand (e.g., the left hand) the user may (a) change the view of selection options using the scrolling device, e.g., wheel 44, and (b) move between web pages with the Forward and Back buttons 52 and 54.

The Cut, Copy, and Paste keys 62, 64, and 66 in combination with the scrolling device, e.g., wheel 44, and the application switching device 70 in close proximity enhances the "composition" aspect of using the keyboard. Thus in operation, the user may search and select portions of text, graphical objects, content of cells in spreadsheet, or other items with the dominant hand (e.g., the right hand), and with the non-dominant hand (e.g., the left hand) the user may (a) change the view of selection using the scrolling device to find text or object of interest, (b) Cut, Copy, and Paste items using dedicated keys 62, 64, and 66 in the region, (c) switch between open windows or applications using the application switching device 70, and (d) repeat the steps during any creation or editing experience.

The relative locations between keys, key clusters, rows, and keyboard sections are preferably as shown in the figures. Thus, for example, while not specifically itemized, it is apparent from this specification that the Forward key 54 in the exemplary embodiment shown is entirely directly behind the Paste Key 66. Further, in the preferred embodiment, the entire input zone 40 is preferably, but not necessarily, less than or equal to 5 or 6 cm laterally and less than or equal to 8, 9, or 10 cm front-to-back, resulting in an overall area of less than or equal to 40, 45, 48, 50, 54, or 60 cm$^2$. The size of the "consumption" input region, e.g., the first group of keys 50 and the scroll device 44, is preferably, but not necessarily, less than or equal to 4 or 5 cm laterally and less than or equal to 4, 5, or 6 cm front-to-back, resulting in an overall area of less than or equal to 16, 20, 24, 25, or 30 cm$^2$. The size of the "composition" input region, e.g., the second group of keys 60, the scroll device 44, and the application switching device 70, is preferably, but not necessarily, less than or equal to 5 or 6 cm laterally and less than or equal to 7, 8, or 9 cm front-to-back, resulting in an overall area of less than or equal to 35, 40, 42, 45, 48, or 54 cm$^2$.

It is recognized that in use, the keyboard 20 would preferably be coupled to a system, such as, but not necessarily, a computer including a processor and software to run the application programs. The keys for the keyboard 20 may be operable to provide the desired commands to the system according to any known arrangement. Further, while the keyboard 20 in the figures is shown as being of the type physically separated from a computer or appliance, it is recognized that the keyboard may be structurally integrated into a computer, such as a laptop computer, or an appliance or other device. Additionally, while the keys as shown are preferably of standard size and shape for computer keyboards, it is recognized that the herein-described invention shall be limited solely by the claims appended hereto.

What is claimed is:

1. A keyboard comprising:

an alphanumeric section; and a rotatable wheel having a width, first and second sides, and an outer diameter at each said side, said outer diameter being larger at said first side than said second side, said first side being more proximal to the alphanumeric section than said second side.

2. A keyboard comprising a rotatable frustum-shaped member, and at least one of a Cut key, a Copy key, and a Paste key located within 1 cm of said rotatable frustum-shaped member.

3. The keyboard of claim 2, further comprising an input element that provides a back command when actuated.

4. The keyboard of claim 1, further including:

a Cut key a Copy key, and a Paste key, at least one of which is within 3 cm of the rotatable wheel;

an input element that provides a back command when actuated; and a keyboard upper housing having a planar section and raised ridge, wherein the rotatable wheel is spaced laterally from the alphanumeric section, is rotatable about an axis extending laterally relative to the keyboard, and is located in the raised ridge.

* * * * *

UNITED STATES PATENT AND TRADEMARK OFFICE
CERTIFICATE OF CORRECTION

PATENT NO. : 6,939,067 B2  Page 1 of 1
APPLICATION NO. : 10/735651
DATED : September 6, 2005
INVENTOR(S) : Hugh E. McLoone et al.

It is certified that error appears in the above-identified patent and that said Letters Patent is hereby corrected as shown below:

On the title page, item (56), under "Other Publications", in column 2, line 1, delete "buxon" and insert -- buxton --, therefor.

On page 2, item (56), under "U.S. Patent Documents", in column 1, line 5, delete "341/122" and insert -- 341/22 --, therefor.

On page 2, item (56), under "Other Publications", in column 2, line 1, delete "dp." and insert -- dgp. --, therefor.

On page 2, item (56), under "Other Publications", in column 2, line 8, after "Brad" delete ",".

In column 10, line 51, in Claim 2, delete "1 cm" and insert -- 3 cm --, therefor.

In column 10, line 56, in Claim 4, after "a Cut key" insert -- , --, therefor.

Signed and Sealed this

Twenty-first Day of July, 2009

JOHN DOLL
*Acting Director of the United States Patent and Trademark Office*